(12) United States Patent
Kuhns

(10) Patent No.: US 10,184,562 B2
(45) Date of Patent: Jan. 22, 2019

(54) DEVICE INCLUDING AN ANTI-ROTATION MECHANISM FOR A PISTON AND A METHOD OF USING THE SAME

(71) Applicants: EATON CORPORATION, Cleveland, OH (US); Matthew Monroe Kuhns, Irvine, CA (US)

(72) Inventor: Matthew Monroe Kuhns, Irvine, CA (US)

(73) Assignee: Eaton Intelligent Power Limited, Dublin (IE)

( * ) Notice: Subject to any disclaimer, the term of this patent is extended or adjusted under 35 U.S.C. 154(b) by 131 days.

(21) Appl. No.: 15/314,548

(22) PCT Filed: Jun. 2, 2015

(86) PCT No.: PCT/US2015/033660
§ 371 (c)(1),
(2) Date: Nov. 29, 2016

(87) PCT Pub. No.: WO2015/157614
PCT Pub. Date: Dec. 10, 2015

(65) Prior Publication Data
US 2017/0108121 A1    Apr. 20, 2017

Related U.S. Application Data

(60) Provisional application No. 62/006,318, filed on Jun. 2, 2014.

(51) Int. Cl.
*F15B 15/20* (2006.01)
*F16J 1/04* (2006.01)
(Continued)

(52) U.S. Cl.
CPC ............... *F16J 1/04* (2013.01); *F04B 53/007* (2013.01); *F04B 53/14* (2013.01); *F04B 53/16* (2013.01);
(Continued)

(58) Field of Classification Search
CPC ...................... F15B 15/1414; F15B 2015/1495
(Continued)

(56) References Cited

U.S. PATENT DOCUMENTS 4,620,752 A    11/1986 Fremerey et al.
4,744,287 A *  5/1988 Miyamoto ............ F15B 15/086
                                                    92/165 PR
(Continued)

FOREIGN PATENT DOCUMENTS

EP    1350303 A4    10/2003
WO    2003021122 A1  3/2003

*Primary Examiner* — Michael Leslie
(74) *Attorney, Agent, or Firm* — Benesch Friedlander Coplan & Aronoff LLP

(57) ABSTRACT

A device includes an outer cylinder having a cylinder inner wall and a cylinder outer wall and at least one magnet disposed on or between the cylinder inner wall and the cylinder outer wall and a piston having a piston inner wall and a piston outer wall and at least one magnet disposed on or between the piston outer wall and the piston inner wall. In one embodiment, the piston is rotatable within the cylinder and slidably movable along an axis respective to the cylinder. The piston is also disposed within the cylinder such that the at least one magnet disposed on or between the cylinder inner wall and the cylinder outer wall is aligned with the at least one magnet disposed on or between the piston outer wall and the piston inner wall, substantially preventing the piston from rotating relative to the cylinder.

20 Claims, 12 Drawing Sheets

(51) Int. Cl.

| | | |
|---|---|---|
| F15B 15/14 | (2006.01) | |
| F04B 53/00 | (2006.01) | |
| F04B 53/16 | (2006.01) | |
| F04B 53/22 | (2006.01) | |
| F16J 10/02 | (2006.01) | |
| F16H 25/00 | (2006.01) | |
| F04B 53/14 | (2006.01) | |
| F16H 25/20 | (2006.01) | |
| F16J 1/00 | (2006.01) | |
| F16K 31/04 | (2006.01) | |
| F16K 31/50 | (2006.01) | |

(52) U.S. Cl.
CPC ............ *F04B 53/162* (2013.01); *F04B 53/22* (2013.01); *F15B 15/1414* (2013.01); *F16H 25/00* (2013.01); *F16H 25/20* (2013.01); *F16J 1/006* (2013.01); *F16J 10/02* (2013.01); *F16K 31/047* (2013.01); *F16K 31/508* (2013.01); *F16H 2025/204* (2013.01); *F16H 2025/2075* (2013.01)

(58) Field of Classification Search
USPC .................................................. 92/165 PR
See application file for complete search history.

(56) References Cited

U.S. PATENT DOCUMENTS

| | | |
|---|---|---|
| 5,126,610 A | 6/1992 | Fremerey |
| 5,346,155 A | 9/1994 | Alexander et al. |
| 5,561,335 A | 10/1996 | Dunfield et al. |
| 5,736,798 A | 4/1998 | O'Brien et al. |
| 2008/0084130 A1 | 4/2008 | Darby et al. |
| 2008/0297074 A1 | 12/2008 | Sheahen, Jr. et al. |
| 2011/0298324 A1 | 12/2011 | Peck, Jr. |
| 2012/0080968 A1 | 4/2012 | Knight et al. |
| 2012/0228067 A1 | 9/2012 | Muratori et al. |

\* cited by examiner

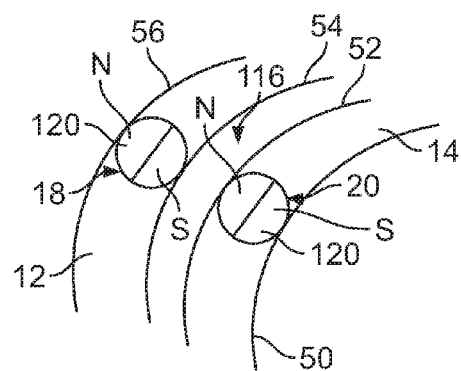
FIG. 4C
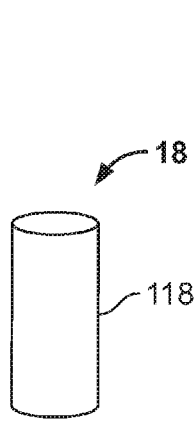 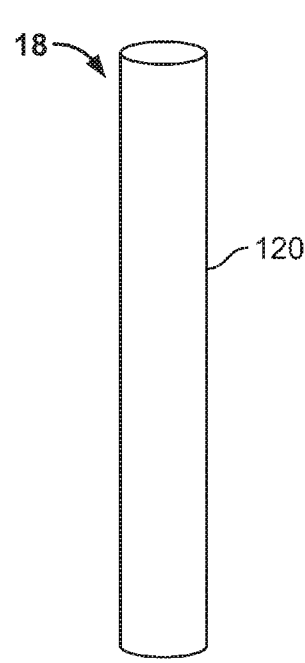 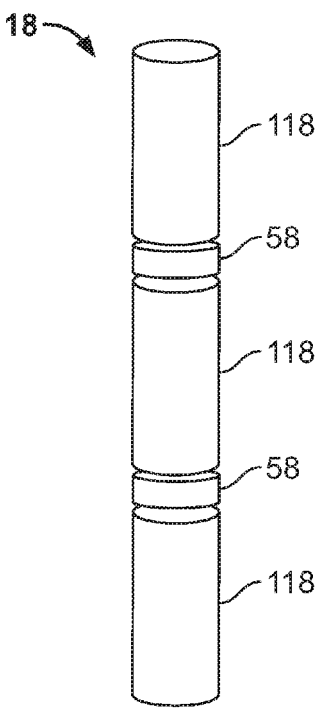
FIG. 5A  FIG. 5B  FIG. 5C

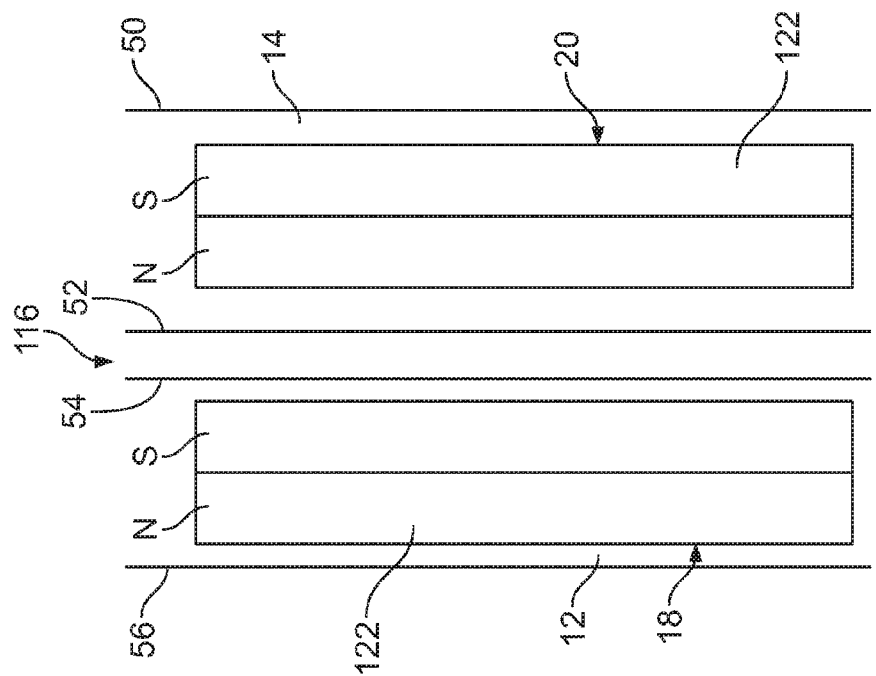
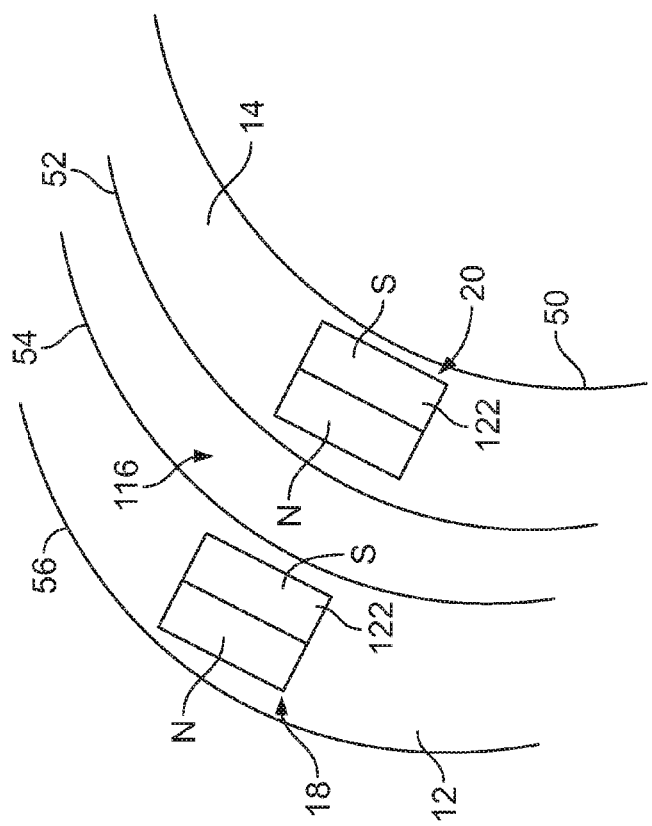

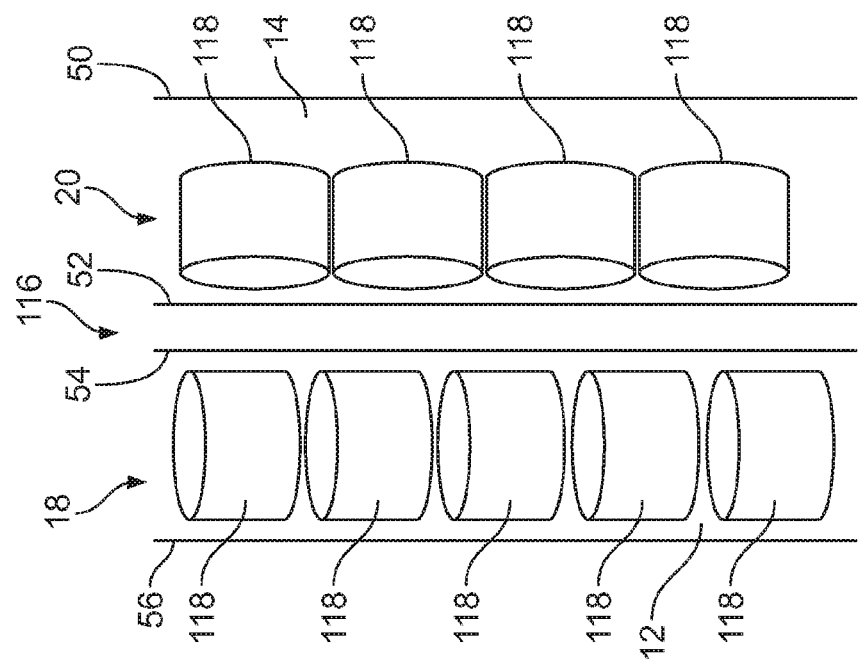
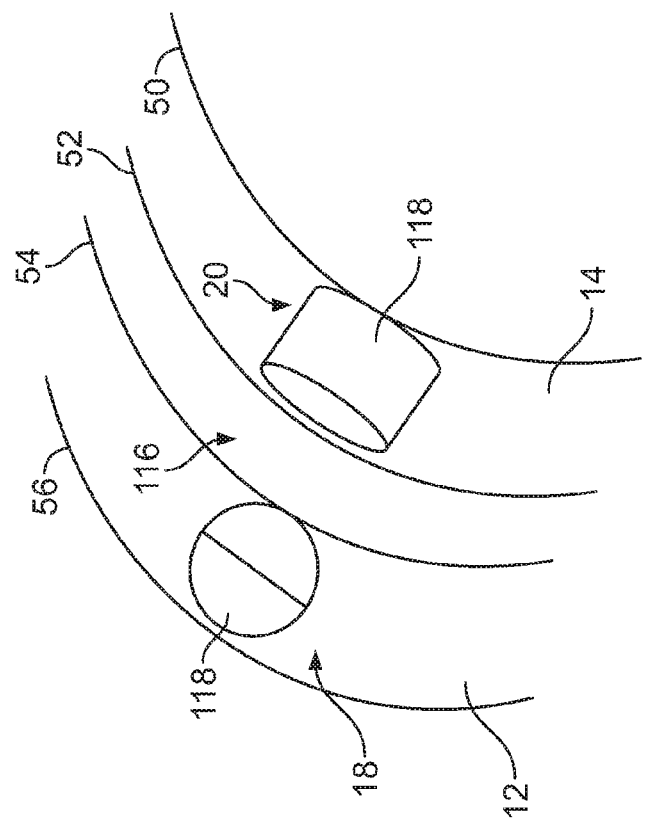
FIG. 7B
FIG. 7A

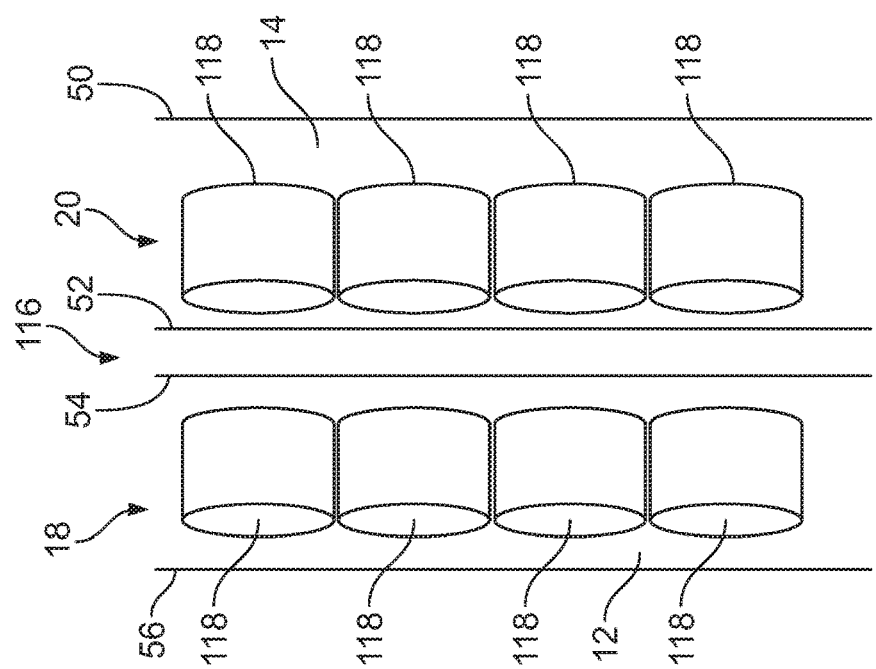
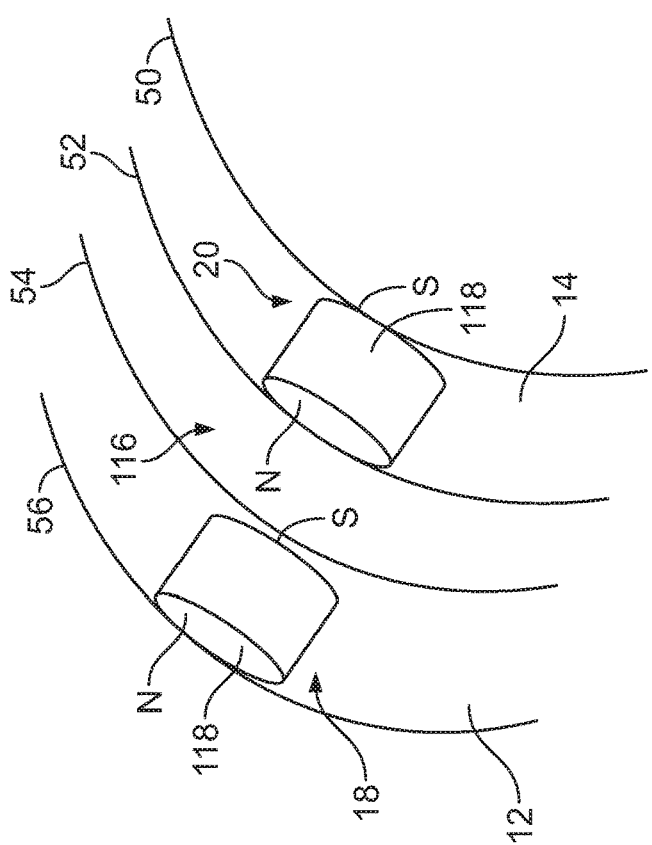

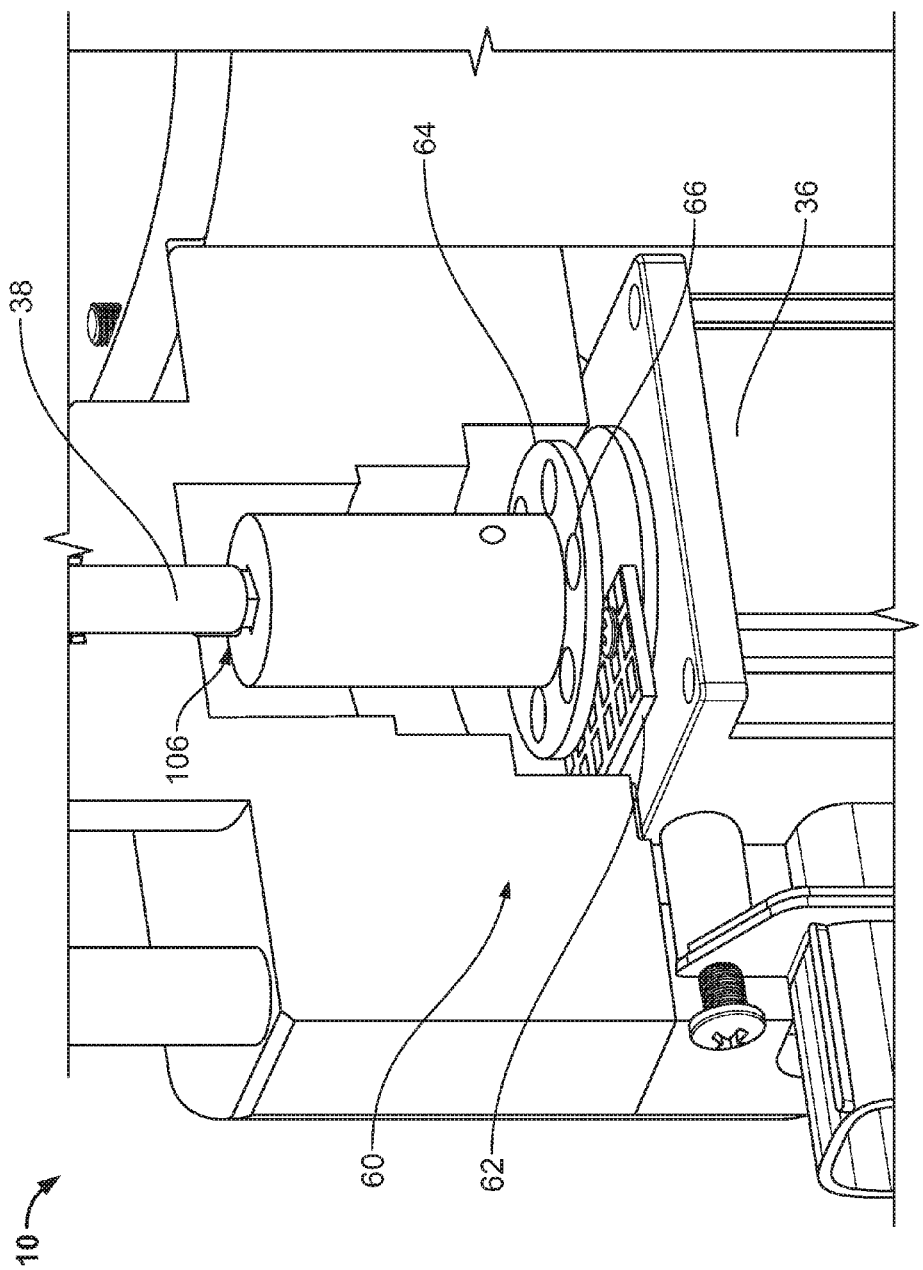

DEVICE INCLUDING AN ANTI-ROTATION MECHANISM FOR A PISTON AND A METHOD OF USING THE SAME

CROSS-REFERENCE TO RELATED APPLICATIONS

This application is a 371 National Stage filing of PCT Application No. PCT/US2015/33660 filed Jun. 2, 2015, which claims benefit of U.S. Provisional Patent Application No. 62/006,318 filed Jun. 2, 2014, both of which are incorporated by reference herein in their entirety.

TECHNICAL FIELD

The present disclosure relates to pistons. Specifically, the disclosure relates to devices for preventing a piston from rotating around an actuation axis when being opened and closed within a cylinder.

BACKGROUND ART

Pistons are commonly used in a variety of applications, such as engines, valves, and pumps, to either derive or impart motion. A piston moves up and down inside a valve, a tube, or other similar cylinder. As a piston moves up and down inside a cylinder, the piston may tend to rotate around its vertical axis. Rotation may damage the surface of the piston or the inside of the cylinder, which can result in ineffective operation of, for example, an associate engine, valve, or pump.

SUMMARY

In one embodiment, a device can include an outer cylinder having a cylinder inner wall and a cylinder outer wall and at least one magnet disposed between the cylinder inner wall and the cylinder outer wall and a piston having a piston inner wall and a piston outer wall and at least one magnet disposed between the piston inner wall and the piston outer wall. The piston can be rotatable within the cylinder and slidably movable along a vertical axis respective to the cylinder. The piston can also be disposed within the cylinder such that the at least one magnet disposed between the cylinder inner wall and the cylinder outer wall is aligned with the at least one magnet disposed between the piston inner wall and the piston outer wall, substantially preventing the piston from rotating about the horizontal axis inside the cylinder, while allowing free movement along the vertical axis.

In another embodiment, a device can include a cylinder and a piston. The cylinder can have a cylinder inner wall that extends along an actuation axis. The cylinder can include a first magnetic member. The piston can be disposed within the cylinder such that the piston is bounded by the cylinder inner wall. The piston can include a second magnetic member. The piston can slide along the actuation axis and the cylinder inner wall. The first magnetic member of the cylinder and the second magnetic member of the piston can be aligned and can interact to generate a magnetic force. The magnetic force can mitigate rotation of the piston around the actuation axis.

In a further embodiment, a device can include a cylinder, a piston, and a lead screw drive. The cylinder can form a cylinder inner wall that extends along an actuation axis. The cylinder can include a first magnetic member. The piston can be disposed within the cylinder such that the piston is bounded by the cylinder inner wall. The piston can include a second magnetic member. The lead screw drive can be operably connected to the piston. Rotation of the lead screw drive can generate translation of the piston along the actuation axis and the cylinder inner wall. Rotation of the lead screw drive can generate a rotational force that urges the piston to rotate around the actuation axis. The first magnetic member of the cylinder and the second magnetic member of the piston can be aligned and can interact to generate a magnetic force. The magnetic force can be greater than the rotational force.

In yet another embodiment, a device can include a cylinder, a piston, and a plurality of magnetic anti-rotation mechanisms. The cylinder can form a cylinder inner wall that extends along an actuation axis. The piston can be disposed within the cylinder such that the piston is bounded by the cylinder inner wall. The piston can slide along the actuation axis and the cylinder inner wall. The magnetic anti-rotation mechanisms can be coupled to the cylinder and the piston. Each of the magnetic anti-rotation mechanisms can include a first magnetic member and a second magnetic member that are spaced apart and not in physical contact. The first magnetic member and the second magnetic member can interact to generate a magnetic force. The magnetic anti-rotation mechanisms can mitigate rotation of the piston around the actuation axis.

Any of the devices shown and described herein can include a magnetic sensor that detects a magnetic field of the first magnetic member of the cylinder and the second magnetic member of the piston.

According to any of the devices shown and described herein, the magnetic force can be attractive. Alternatively or additionally, the amount of force and the strength of the magnetic anti-rotation mechanisms can be related to the amount of control of needed over the piston.

According to any of the devices shown and described herein, the magnetic force can be repulsive. Alternatively or additionally, the magnetic anti-rotation mechanisms can allow a particular range of rotation of the piston around the actuation axis such as, for example, less than or equal to about 30°.

According to any of the devices shown and described herein, the first magnetic member of the cylinder and the second magnetic member of the piston can be spaced apart and not in physical contact.

According to any of the devices shown and described herein, the cylinder and the piston can be formed from an electrical insulator, a dielectric material, or a combination thereof.

According to any of the devices shown and described herein, the first magnetic member of the cylinder, the second magnetic member of the piston, or both can include one or more electromagnets. Alternatively or additionally, the one or more electromagnets can be turned off to allow the piston to move freely. Alternatively or additionally, the one or more electromagnets can be turned on to allow align the piston to the cylinder.

According to any of the devices shown and described herein, the first magnetic member of the cylinder, the second magnetic member of the piston, or both can include one or more permanent magnets. Alternatively or additionally, the one or more permanent magnets can include a rare earth metal. Alternatively or additionally, the first magnetic member of the cylinder, the second magnetic member of the piston, or both can include magnets that are in a stacked configuration. Alternatively or additionally, each of the magnets is separated by a spacer. Alternatively or additionally, the spacer can include an electrical insulator, a dielectric material, or a combination thereof. Alternatively or additionally, each of the magnets can be a rectangle-shaped magnet. Alternatively or additionally, each of the magnets can be a cylindrical-shaped magnet. Alternatively or additionally, the magnets can be oriented vertically. Alternatively or additionally, the magnets can be oriented horizontally.

According to any of the devices shown and described herein, the first magnetic member of the cylinder can be positioned within the cylinder between the cylinder inner wall and a cylinder outer wall.

According to any of the devices shown and described herein, the second magnetic member of the piston can be positioned within the piston between a piston inner wall and a piston outer wall.

According to any of the devices shown and described herein, the magnetic anti-rotation mechanisms can be distributed evenly around the cylinder and the piston.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 4c schematically depicts the piston and cylinder of FIG. 4a according to one or more embodiments shown and described herein;

FIGS. 5a, b, and c schematically depict alternative embodiments of magnets for use in the piston and cylinder of FIG. 4a according to one or more embodiments shown and described herein;

FIG. 6c schematically depicts the piston and cylinder of FIG. 6a according to one or more embodiments shown and described herein;

FIG. 6d schematically depicts a cross-sectional side view of the piston and cylinder of FIG. 6a according to one or more embodiments shown and described herein;

FIG. 7a schematically depicts a top view of an embodiment of a magnetic anti-rotation mechanism according to one or more embodiments shown and described herein;

FIG. 7b schematically depicts a cross-sectional side view of the magnetic anti-rotation mechanism of FIG. 7a according to one or more embodiments shown and described herein;

FIG. 8a schematically depicts a top view of a magnetic anti-rotation mechanism according to one or more embodiments shown and described herein;

FIG. 8b schematically depicts a cross-sectional side view of the magnetic anti-rotation mechanism of FIG. 8a according to one or more embodiments shown and described herein;

FIG. 10 schematically depicts a perspective view of an encoder for use in the device of FIG. 1 according to one or more embodiments shown and described herein.

DESCRIPTION OF EMBODIMENTS

Figure 1:
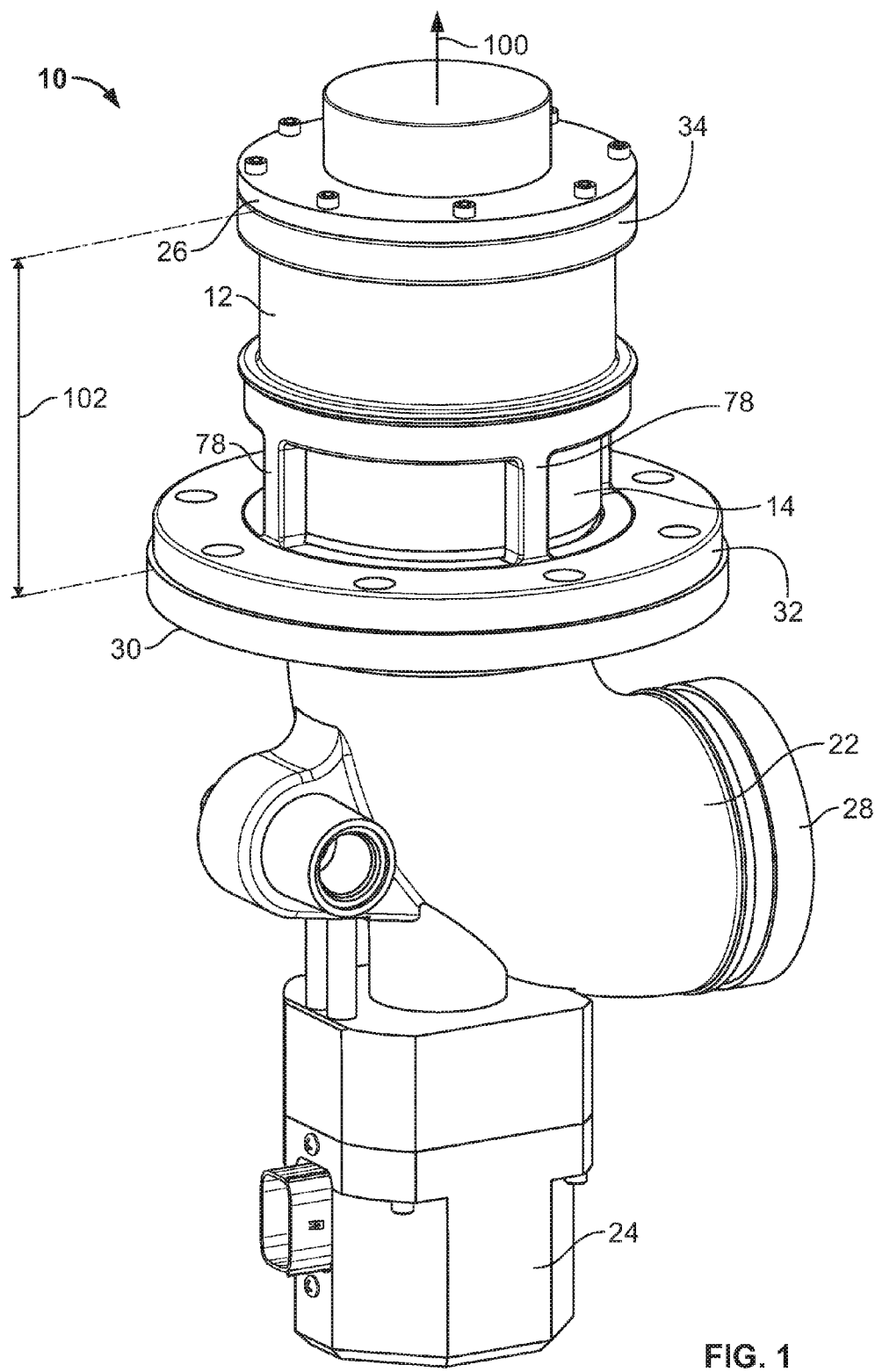
FIG. 1 schematically depicts a perspective view of a device having a cylinder and a piston according to one or more embodiments shown and described herein.

Certain terminology will be used in the foregoing description for convenience in reference only and should not be construed as limiting. For example, the terms "vertical," "vertically," "up," "down," "horizontal," and horizontally" designate directions in the drawings to which reference is made, and the terms "inner" and "outer" referring, respectively, to directions toward and away from the center of the referenced element.

Figure 2:
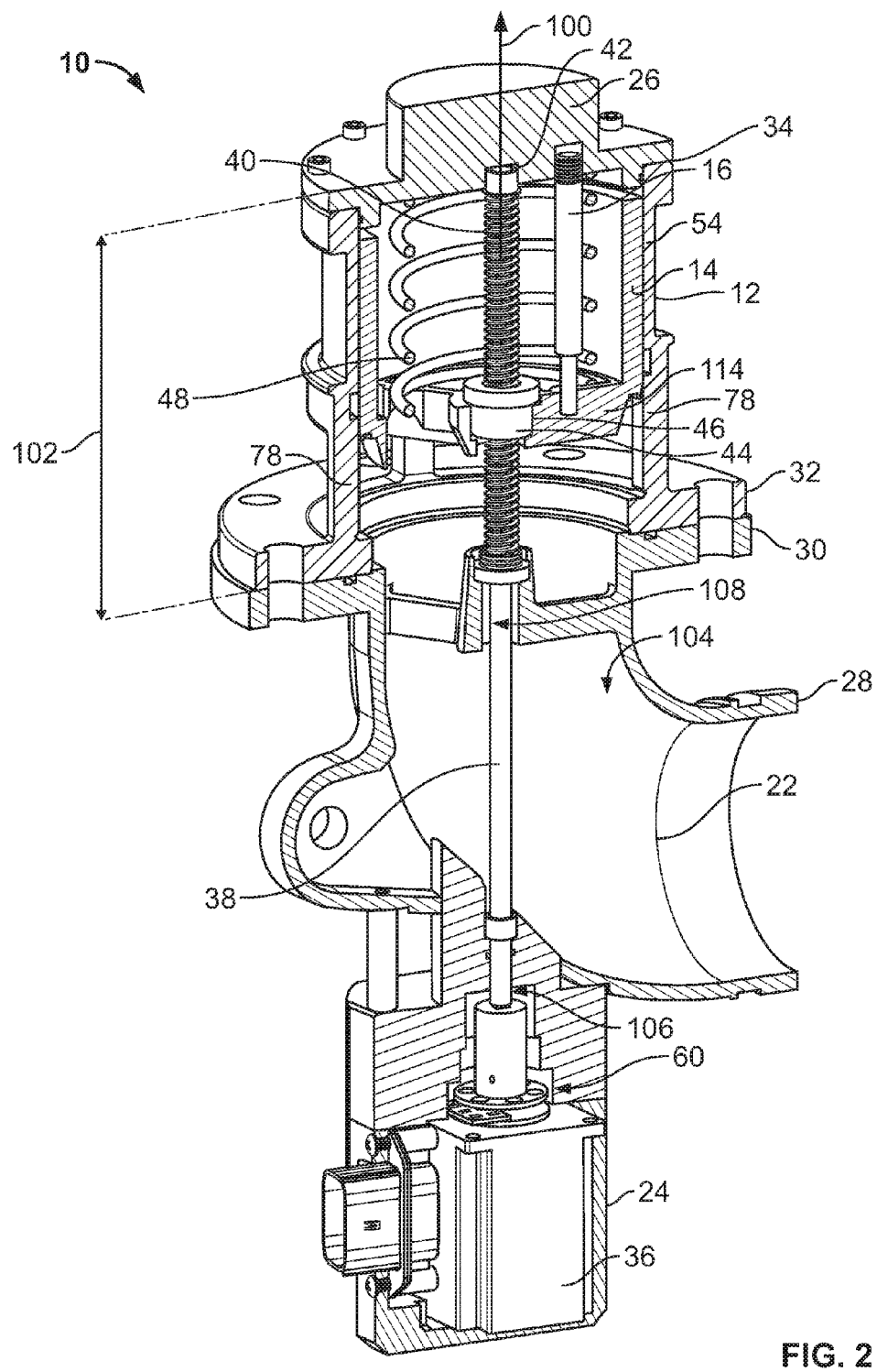
FIG. 2 schematically depicts a cross-sectional view of device of FIG. 1 according to one or more embodiments shown and described herein.

Referring collectively to FIGS. 1 and 2, a device 10 can comprise a cylinder 12 and a piston 14. The cylinder 12 and the piston 14 can be formed from any non-ferrous material, i.e., any material that does not substantially reduce the magnitude of magnetic fields such as, for example, a non-ferrous alloy, an electrical insulator, a dielectric material, or a combination thereof. As is described in greater detail herein, the magnetic fields can be utilized to provide a desired alignment or motion of the piston 14 with respect to the cylinder 12. The cylinder 12 can be configured to bound or at least partially constrain the motion of the piston 14, when the piston 14 is at least partially disposed within the cylinder 12. Accordingly, in some embodiments, the cylinder 12 and the piston 14 can have correspondingly shaped circular cross-sections. For example, in the embodiment depicted in FIG. 2, both the cylinder 12 and the piston 14 can form a generally circular shape along their respective outer peripheries. Specifically, the cylinder 12 can be a chamber that is bored within a body to form a cylinder inner wall 54. In some embodiments, the cylinder inner wall 54 of the cylinder 12 can be a substantially tubular body that extends along an actuation axis 100. It is noted that, while the actuation axis 100 is depicted in FIG. 2 as being oriented substantially vertically, the actuation axis 100 can be aligned in any desired orientation such as, for example, vertically, horizontally, or combinations thereof.

In one embodiment, the piston 14 can be disposed within the cylinder 12 and configured to slide vertically along the actuation axis 100. Accordingly, the cylinder 12 can be configured for reciprocating motion throughout a stroke 102 of the piston 14 while being bounded by the cylinder inner wall 54 of the cylinder 12. Thus, when force is exerted on the piston 14, the piston 14 can be urged to slide up and down with respect to the cylinder inner wall 56 of cylinder 12 and along the actuation axis 100.

In some embodiments, the force that urges the piston 14 along the actuation axis 100 can comprise a rotational component, i.e., the force can urge the piston 14 to rotate around the actuation axis 100. Accordingly, in embodiments having a substantially circular shaped cylinder 12 and piston 14, the cylinder inner wall 54 may not constrain rotational motion of the piston 14. That is, since the piston 14 is configured to slide with respect to the cylinder inner wall 54, the cylinder inner wall 54 may permit the piston 14 to rotate with respect to the actuation axis 100 and the cylinder 12.

Referring still to FIGS. 1 and 2, the device 10 can be configured as a bottom loading valve for use in an electrically actuated fuel tank management system. It is noted that embodiments of the device 10 are described as being configured as a bottom loading valve for clarity. It is furthermore noted that embodiments of the cylinder 12 and the piston 14 can be utilized with any apparatus such as, for example, bottom loading valves, hydrant couplers, in-line valves, bypass valves, or any other device having a cylindrical body that moves with respect to a housing. In some embodiments, the device 10 can comprise a valve body 22 that is configured to selectively provide access to a fuel tank (not shown) for fueling and defueling. In use, the valve body 22 of the device 10 may generally be disposed outside of the fuel tank. Specifically, the valve body 22 can comprise a first end 28 and a second end 30. The first end 28 can be configured to provide a removable connection to a fuel line with a nozzle adaptor (not shown). The device 10 can be connected to the fuel tank such that the second end 30 of the valve body 22 is mounted to an outside surface of the fuel tank.

The cylinder 12 can be mounted within the fuel tank. For example, the cylinder 12 can comprise a first end 32 and a second end 34. The first end 32 of the cylinder 12 can be mounted to an inside surface of the fuel tank such that the device 10 is partially disposed within the tank and partially disposed outside the tank, with a corresponding fluid passageway 104 there through. Accordingly, the device 10 can be selectively sealed by covering orifices located between support pillars 78 of the cylinder 12 and opened by the motion of the piston 14 within the cylinder 12 to selectively provide access to the fuel tank through the orifices. It should be noted that the cylinder 12 and the valve body 22 may be separable parts or may be formed as a single piece.

Referring again to FIG. 2, the device 10 can comprise a motor 36 configured to actuate the piston 14, i.e., the piston 14 can be urged into motion by the motor 36. The motor 36 can be disposed within a motor housing 24 coupled to the valve body 22. The motor 36 can be any device suitable to provide a controlled or measured amount of force such as, for example, a stepper motor. Accordingly, the device 10 can be configured to actuate the piston 14 with the motor 36 as a feedforward system. In some embodiments, device 10 can be configured to transform rotational force provided by the motor 36 into a linear force for actuating the piston 14 throughout the stroke 102. For example, the device 10 can comprise a drive shaft 38 or rod that extends through the valve body 22. The drive shaft 38 can be connected at a first end 106 to the motor 36 and connected at a second end 108 to a lead screw drive 40. In one embodiment, a high efficiency lead screw drive 40 may be used.

According to the embodiments described herein, the device 10 can comprise a valve cap 26 for bounding the cylinder 12. Specifically, the valve cap 26 can be connected to the device 10 at a second end 34 of the cylinder 12. Accordingly, the valve cap 26 can also demarcate the stroke 102 of piston 14. Additionally, the valve cap 26 can be configured to align the lead screw drive 40 with the actuation axis 100. Specifically, the lead screw drive 40 can be connected to the valve cap 26 such that an upper end 76 of the lead screw drive 40 is confined within an opening 42 in a surface of the valve cap 26 that demarcates the cylinder 14. Accordingly, rotation of the drive shaft 38 and the lead screw drive 40 can be provided around or with respect to the actuation axis 100.

The lead screw drive 40 can be operably connected to the piston 14 such that rotation of the lead screw drive 40 generates a translation of the piston 14. That is, rotation of the lead screw drive 40 can cause the piston 14 to translate along the length of the lead screw drive 40 and the actuation axis 100. In some embodiments, a lead screw nut 44 can be disposed about the outer surface of the lead screw drive 40 to form a threaded engagement. Additionally, the lead screw nut 44 can be engaged with the piston 14 such that rotation of the lead screw nut 44 with respect to the piston 14 is substantially prevented. Furthermore, the device 10 can comprise a spring 48 configured to bias the piston 14 in a preferred direction along the actuation axis 100. Specifically, the spring 48 can be helical and can exert pressure against the piston 14 when the piston 14 is in an open position, which is depicted in FIG. 2. Accordingly, the spring 48 can bias the piston 14 to a closed position, which is depicted in FIG. 1.

Figure 3:
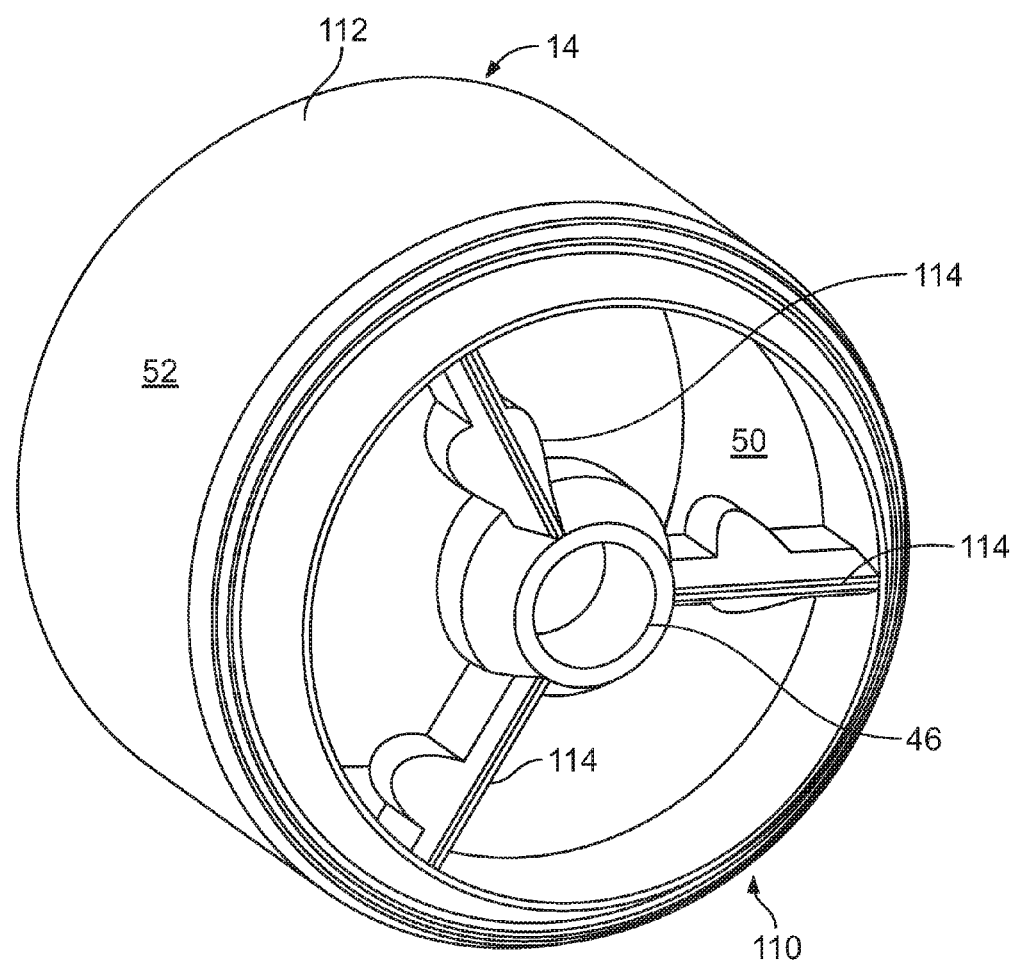
FIG. 3 schematically depicts a perspective view of a piston for use in the device of FIG. 1 according to one or more embodiments shown and described herein.

Referring collectively to FIGS. 2 and 3, the piston 14 can comprise a crown 110 that is configured to interact with a fluid, e.g., a compressible or non-compressible fluid. The piston 14 can also comprise a skirt 112 that extends away from the crown 110. The skirt 112 of the piston 14 can be a body that is demarcated by a piston inner wall 50 and a piston outer wall 52. As is noted above, the piston 114 can be substantially cylindrically shaped. Accordingly, each of the piston inner wall 50 and the piston outer wall 52 can be correspondingly shaped. In some embodiments, the piston 14 can be configured as a low drag piston that rapidly equalizes the pressure differentials on opposing sides of the crown 110. Specifically, the crown 110 can comprise a plurality of spokes 114 that demarcate fluid paths formed through the crown 110. Thus, when the spring 48 is disposed between the spokes 114 of the piston 14 and the valve cap 26, the spring 48 can actuate the piston 14.

In operation, when the motor 36 is electronically activated, the drive shaft 38 and lead screw drive 40 can be rotated. Accordingly, the motor 36 can urge the piston 14 along the actuation axis 100 and compress the spring 38 to store energy. As the piston 14 is moved along the actuation axis 10, the piston 14 can transition from a closed position (as depicted in FIG. 1), to an open position (as depicted in FIG. 2). When the piston 14 is in the open position, fuel may flow through the device 10.

When power to the motor 36 is discontinued, the piston 14 can move back to the closed position as the lead screw drive 40 rotates in the opposite direction due to the force exerted against the piston 14 by the spring 48 to automatically close the valve 10. Thus, the piston 14 can reciprocate using the stored energy of the spring 38. Moreover, since the piston 14 is configured for low drag. The amount of spring 48 force needed to move the piston 14 can be low compared to a piston 14 not configured for low drag. Additionally, the piston 14 can be configured to self-close, which can act as a failsafe to prevent flow of fuel in the event that power to the motor 36 is lost.

Referring again to FIG. 2, in some embodiments, the lead screw nut 44 can be fixed within an orifice 46 in the piston 14. Accordingly, as is noted above, rotation of the lead screw drive 40 can cause the lead screw nut 44 and the piston 14 to translate along the actuation axis 100. Since the piston 14 is configured to slide within the cylinder 12, at least a portion of the rotational motion of the lead screw drive 40 can be transformed into undesired rotation of the piston 14 with respect to the cylinder 12. Thus, in some embodiments, the device 10 can comprise an anti-rotation mechanism 16 configured to substantially prevent rotational movement of the piston 14 relative to the cylinder 12. In some embodiments, the anti-rotation mechanism 16 can comprise a rod that is fixed with respect to the cylinder 12 and placed in contact with the piston 14. Specifically, the anti-rotation mechanism 16 can be connected to the valve cap 26 and extend within the stroke 102 of the piston 14 and contact one of the spokes 114 of the piston 14.

Figure 4A:
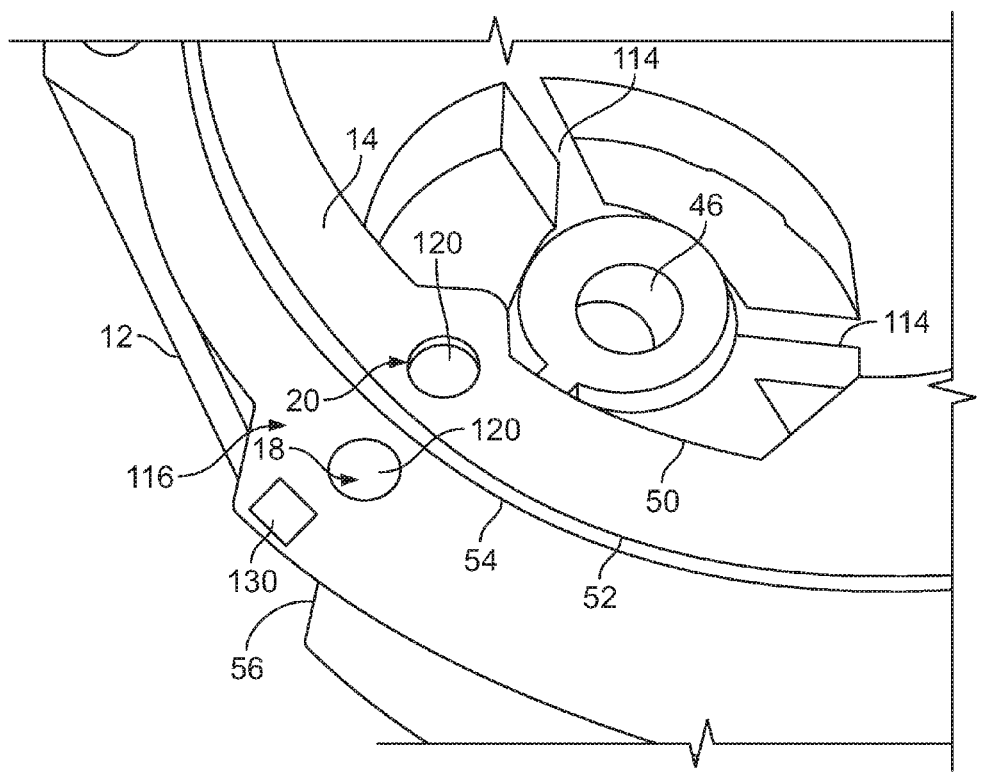
FIG. 4a schematically depicts a perspective view of one embodiment of a piston and cylinder for use in the device of FIG. 1 according to one or more embodiments shown and described herein.
Figure 4B:
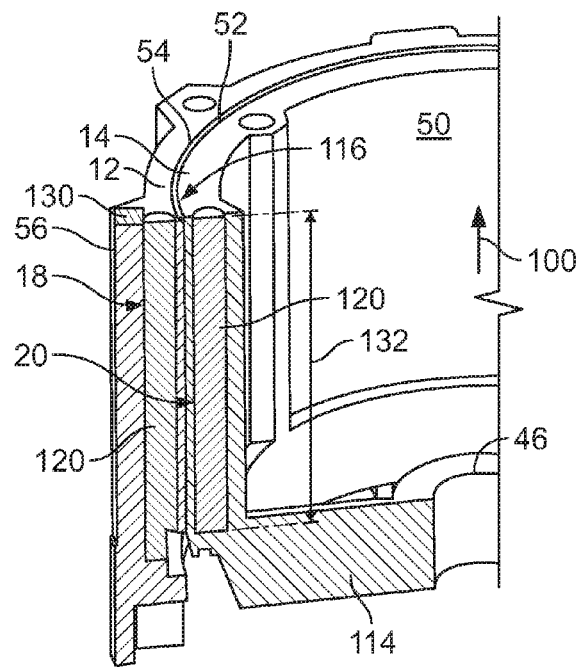
FIG. 4b schematically depicts a cross-section side view of the piston and cylinder of FIG. 4a according to one or more embodiments shown and described herein.
Figure 6A:
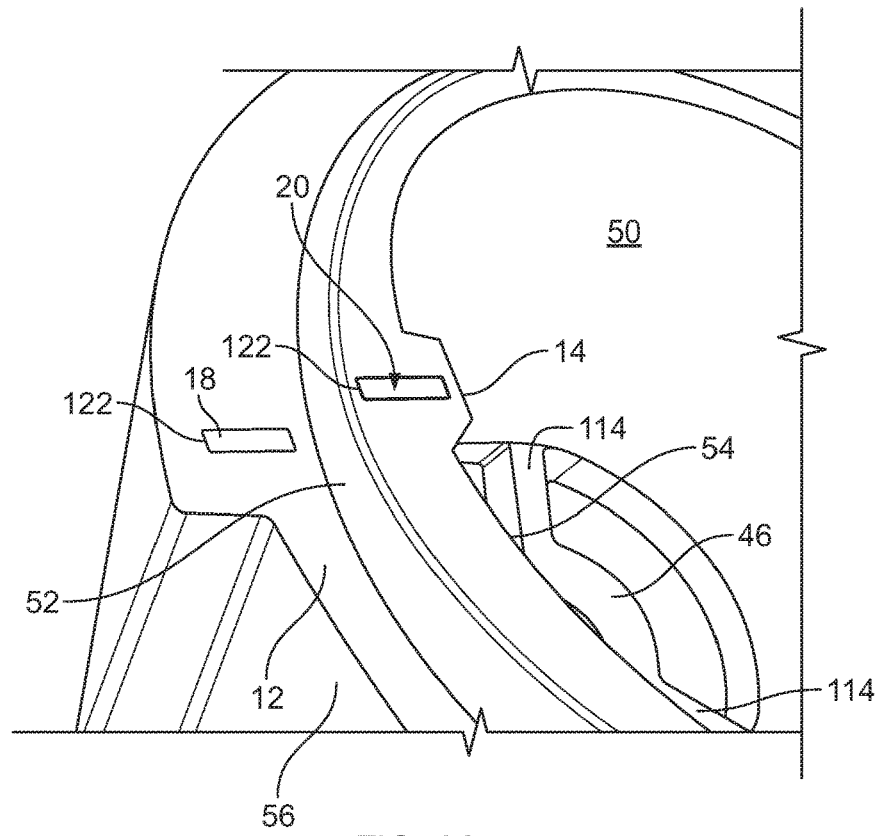
FIG. 6a schematically depicts a perspective view of one embodiment of a piston and cylinder for use in the device of FIG. 1 according to one or more embodiments shown and described herein.
Figure 6B:
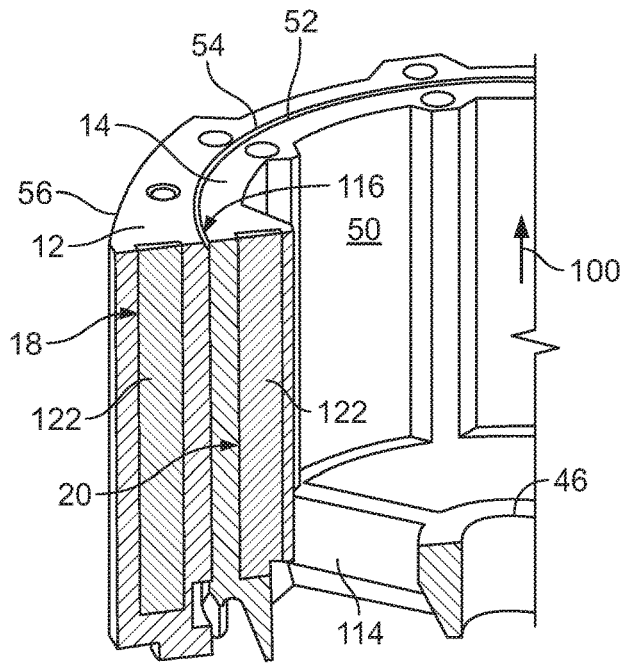
FIG. 6b schematically depicts a cross-section side view of the piston and cylinder of FIG. 6a according to one or more embodiments shown and described herein.

Referring collectively to FIGS. 4a, 4b, and 4c, the embodiments described herein can alternatively or additionally comprise a magnetic anti-rotation mechanism 116 configured to substantially prevent rotational movement of the piston 14 relative to the cylinder 12. It should be appreciated that, while the magnetic anti-rotation mechanism 116 is described herein with respect to a particular device 10, the magnetic anti-rotation mechanism 116 can be utilized with any apparatus such as, for example, bottom loading valves, hydrant couplers, in-line valves, bypass valves, or any other device having a cylindrical body that moves with respect to a housing. It is furthermore noted that, while the embodiments depicted in FIGS. 4a-4c comprise a single magnetic anti-rotation mechanism 116, embodiments of the present disclosure can be provided with a plurality of magnetic anti-rotation mechanisms 116. For example, in some embodiments the magnetic anti-rotation mechanisms 116 can be distributed evenly around the cylinder 12 and piston 14 such that each magnetic anti-rotation mechanisms 116 is offset by a substantially equal angular increment or arc length. Accordingly, imbalance of the piston 14 can be mitigated. Moreover, distributing the magnetic anti-rotation mechanisms 116 can balance off axis forces on the piston 14.

The magnetic anti-rotation mechanism 116 can comprise a first magnetic member 18 and a second magnetic member 20 that are arranged with respect to one another to generate a magnetic force. For example, the first magnetic member 18 can be coupled to the cylinder 12 such that the first magnetic member 18 remains substantially stationary with respect to the cylinder 12 when subjected to the force generated by the first magnetic member 18 and the second magnetic member 20. Likewise, the second magnetic member 20 can be coupled to the piston 14 such that the second magnetic member 20 remains substantially stationary with respect to the piston 14 when subjected to the force generated by the first magnetic member 18 and the second magnetic member 20.

It is noted that the force generated by the first magnetic member 18 and the second magnetic member 20 is generally a magnetic force. As is explained in greater detail herein, the magnetic force can be attractive, i.e., the force urges the first magnetic member 18 and the second magnetic member 20 together. Alternatively or additionally, the magnetic force can be repulsive, i.e., the force urges the first magnetic member 18 and the second magnetic member 20 apart. In some embodiments, the magnetic force can alternate between attractive and repulsive depending upon the relative position of the cylinder 12 and the piston 14.

The force generated by the magnetic anti-rotation mechanism 116 can be configured to prevent rotation of the piston 12 around the vertical axis 100 during normal operation of the piston 12. In some embodiments, the magnetic anti-rotation mechanism 116 can constrain the piston 14 with respect to the cylinder 12 without requiring physical contact between the piston 14 and the cylinder 12, the first magnetic member 18 and the second magnetic member 20, or both. For example, the first magnetic member 18 and the second magnetic member 20 can be aligned and spaced apart to substantially prevent the piston 14 from rotating within the cylinder 12. Accordingly, the piston 14 and the cylinder 12 can be kept in a desired alignment, while the first magnetic member 18 and the second magnetic member 20 interact to generate the force.

It is noted that the relative strength of the force generated by the first magnetic member 18 and the second magnetic member 20 can be dependent upon the size, shape, orientation, and field strength of the magnets used to form the first magnetic member 18 and the second magnetic member 20. In addition, the shape, material, and size of the piston 14 and the cylinder 12 can impact the strength of the force. Generally, the first magnetic member 18 and the second magnetic member 20 should be tuned to the rotational forces that generate the undesired rotation of the piston 14 with respect to the cylinder 12. For example, the first magnetic member 18 and the second magnetic member 20 should be tuned such that the amount of force needed to alter the alignment promoted by the magnetic anti-rotation mechanism 116 is greater than the rotational forces, e.g., the rotational forces generated by the motor 36 at the lead screw drive 40 can cause the lead screw nut 44. Accordingly, it should be understood that any size, shape or strength magnet, suitable to prevent a piston 14 from rotating with respect to the cylinder 12 may be used. Suitable shapes for magnets include, but are not limited to, cylindrical, round, oval, square, or rectangular.

In one embodiment, the first magnetic member 18 can be disposed within the walls of the cylinder 12. For example, the first magnetic member 18 can be positioned within the cylinder 12 between the cylinder inner wall 54 and the cylinder outer wall 56. Alternatively or additionally, the second magnetic member 20 can be disposed within the walls of the piston 14. Specifically, the second magnetic member 20 can be positioned within the piston 14 between the piston inner wall 52 and the piston outer wall 54. Accordingly, the cylinder 12 can be formed around the first magnetic member 18 and the piston 14 can be formed around the second magnetic member 20. In other embodiments, the first magnetic member 18 may be disposed within the cylinder 12, after the cylinder 12 is formed, and the second magnetic member 20 may be disposed within the piston 14, after the piston 14 is formed. For example, a channel can be bored within the each component to receive one of the first magnetic member 18 and the second magnetic member 20, which can be secured within the channel. Alternatively or additionally, the first magnetic member 18 may be disposed on the cylinder inner wall 54, the cylinder outer wall 56, or both, or flush against the cylinder inner wall 54, the cylinder outer wall 56, or both. Alternatively or additionally, the second magnetic member 20 may be disposed on the piston inner wall 50, the piston outer wall 52, or both, or flush against the piston inner wall 50, the piston outer wall 52, or both.

Referring still to FIGS. 4a, 4b and 4c, each of the first magnetic member 18 and the second magnetic member 20 can comprise one or more magnets that generate magnetic fields. In some embodiments, the magnets can be permanent magnets, i.e., an object formed from ferromagnetic material that has an internal structure that has been magnetized such that the ferromagnetic material generates a magnetic field for a period of use. Suitable ferromagnetic material includes iron, nickel, cobalt, alloys of rare earth metals, or the like. As shown in FIGS. 4c, 6c, 6d, 8a, and 9, the magnetic fields described herein can be oriented according to polarity, i.e., a north pole N and a south pole S. It is noted that, while the magnetic fields are described herein with respect to magnetic poles, the embodiments described herein are not so limited. Accordingly, the embodiments described herein can be formed by aligning the magnetic fields to generate attractive or repulsive forces according to atomic currents or the like. In further embodiments, the one or more magnets can comprise electromagnets.

Referring collectively to FIGS. 5a, 5b, and 5c, the first magnetic member 18 can comprise one or more magnet that is cylindrical in shape. In some embodiments, the cylindrical shape can be of varying heights. For example, as depicted in FIG. 5a, the first magnetic member 18 can comprise a cylindrical-shaped magnet 118 that is shorter in height than the height of the piston 14. Alternatively, as depicted in FIG. 5b, the first magnetic member 18 can comprise a cylindrical-shaped magnet 120 that is approximately equal to the height of the piston 14. In yet another example, as depicted in FIG. 5c, the first magnetic member 18 can comprise multiple cylindrical-shaped magnets 118. Each of the cylindrical-shaped magnets 118 can be shorter in height than the height of the piston 14. In some embodiments, the cylindrical-shaped magnets 118 can be stacked upon each other in a vertical orientation, i.e., the flat faces of the cylindrical-shaped magnets 118 can face one another. The use of stack configurations can reduce the unit cost of the magnets.

Alternatively or additionally, each the cylindrical-shaped magnets 118 in the stack can be separated by a spacer 58. In some embodiments, the spacer 58 can be formed from an electrical insulator, a dielectric material, or a combination thereof. The use of spacers 58 can cause the magnetic force to vary in a manner that is indexed to the spacers 58. Accordingly, the spacers 58 can be utilized to index the motion of the piston 14 (FIGS. 1-4c). It is noted that, while FIGS. 5a, 5b, and 5c are described with respect to the first magnetic member 18, the second magnetic member 20 can also comprise one or more magnet that is cylindrical in shape, as described above with respect to the first magnetic member 18.

Referring again to FIGS. 4b and 4c, each of the first magnetic member 18 and the second magnetic member 20 can be elongate and extend along the actuation axis 100. In some embodiments, the one or more magnets of the first magnetic member 18 can extend along the actuation axis 100 for a majority of the height of the cylinder 12. Additionally, the one or more magnets of the second magnetic member 20 can extend along the actuation axis 100 for a majority of the height of the piston 14. Accordingly, the first magnetic member 18 and the second magnetic member 20 can generate attractive or repulsive forces as the piston 14 moves to various positions along the actuation axis 100.

For example, the second magnetic member 20 of the piston 14 can be aligned with the first magnetic member 18 of the cylinder 12 such that the north pole N of the second magnetic member 20 of the piston 14 faces the south pole S of the first magnetic member 18 of the cylinder 12. Thus, the second magnetic member 20 and the first magnetic member 18 can generate an attractive force, i.e., the piston 14 can be urged towards the cylinder 12 by the attractive force. It should be understood, however, that the second magnetic member 20 in the piston 14 and the first magnetic member 18 in the cylinder 12 can be positioned in any way suitable to prevent the piston 14 from rotating inside cylinder 12. For example, in some embodiments the south pole S of the second magnetic member 20 of the piston 14 can face the north pole N of the first magnetic member 18 of the cylinder 12.

The attractive force can be operable to mitigate rotation of the piston 14 with respect to the cylinder 12. Specifically, the force generated by the magnetic anti-rotation mechanism 116 can be relatively high when the piston 14 with respect to the cylinder 12 are aligned. Additionally, the force generated by the magnetic anti-rotation mechanism 116 can be configured to urge the piston 14 and the cylinder 12 into alignment, i.e., the magnetic anti-rotation mechanism 116 can provide residual magnetic force as the piston 14 and the cylinder 12 are moved out of alignment that realigns the piston 14 and the cylinder 12. Thus, any rotational forces would need to overcome the force generated by the magnetic anti-rotation mechanism 116 to rotate the piston 14 out of alignment with respect to the cylinder 12.

Referring now to FIGS. 6a-6d, in some embodiments, each of the first magnetic member 18 and the second magnetic member 20 of the magnetic anti-rotation mechanism 116 can comprise one or more rectangle-shaped magnet 122. As used herein, the phrase "rectangle-shaped" can mean an object having a substantially rectangular cross sectional shape. In one embodiment, the first magnetic member 18 can comprise a rectangle-shaped magnet 122 disposed between the cylinder inner wall 54 and the cylinder outer wall 56. Additionally, the second magnetic member 20 can comprise a rectangle-shaped magnet 122 disposed between the piston inner wall 50 and the piston outer wall 52. Each rectangle-shaped magnet 122 of the first magnetic member 18 and the second magnetic member 20 can be aligned to in any way suitable to prevent the piston 14 from rotating inside cylinder 12, as described above with reference to the cylinder-shaped magnets. For example, the south pole S of the rectangle-shaped magnet 122 of the first magnetic member 18 can face the north pole N of the rectangle-shaped magnet 122 of the second magnetic member 20, or vice versa. Additionally, it is noted that each of the first magnetic member 18 and the second magnetic member 20 of the magnetic anti-rotation mechanism 116 can comprise multiple rectangle-shaped magnets 122 stacked in a manner analogous to the stacked configuration of cylindrical-shaped magnets 118 depicted in FIG. 5c.

In yet another embodiment, depicted in FIGS. 7a and 7b, one of the first magnetic member 18 and the second magnetic member 20 can comprise a stacked configuration of cylindrical-shaped magnets 118 provided in a horizontal orientation. For example, the second magnetic member 20 can comprise multiple cylindrical-shaped magnets 118 stacked in a horizontal orientation, i.e., the curved face of each of the cylindrical-shaped magnets 118 can face at least one other curved face of the cylindrical-shaped magnets 118. The stack of cylindrical-shaped magnets 118 of the second magnetic member 20 can be disposed between the piston inner wall 50 and piston outer wall 52. The first magnetic member 18 can comprise multiple cylindrical-shaped magnets 118 stacked in a vertical orientation. The stack of cylindrical-shaped magnets 118 of the first magnetic member 18 can be disposed between the piston inner wall 50 and piston outer wall 52. Accordingly, the cylinder 12 and the piston 14 can be aligned such that the curved faces of the cylindrical-shaped magnets 118 of the first magnetic member 18 face flat faces of the cylindrical-shaped magnets 118 of the second magnetic member 20. Optionally, each of the cylindrical-shaped magnets 118 of the stack of the first magnetic member 18, the second magnetic member 20, or both can be separated using a spacer 58 (FIG. 5c). Additionally, it is noted that polarity of the cylindrical-shaped magnets 118 of the first magnetic member 18 and the second magnetic member 20 can be arranged to generate an attractive force, as described hereinabove.

In another embodiment, as depicted in FIGS. 8a and 8b, the first magnetic member 18 and the second magnetic member 20 can comprise a stacked configuration of cylindrical-shaped magnets 118 provided in a horizontal orientation. Specifically, the stack of cylindrical-shaped magnets 118 of the first magnetic member 18 can be disposed between the cylinder inner wall 54 and the cylinder outer wall 56. The stack of cylindrical-shaped magnets 118 of the second magnetic member 20 can be disposed between the piston inner wall 50 and piston outer wall 52. Accordingly, the cylinder 12 and the piston 14 can be aligned such that flat faces of the cylindrical-shaped magnets 118 of the first magnetic member 18 face flat faces of the cylindrical-shaped magnets 118 of the second magnetic member 20. The polarity of the cylindrical-shaped magnets 118 of the first magnetic member 18 and the second magnetic member 20 can be arranged to generate an attractive force. For example, the south pole S of the cylindrical-shaped magnets 118 of the first magnetic member 18 can face the north pole N of the cylindrical-shaped magnets 118 of the second magnetic member 20, or vice versa.

Figure 9:
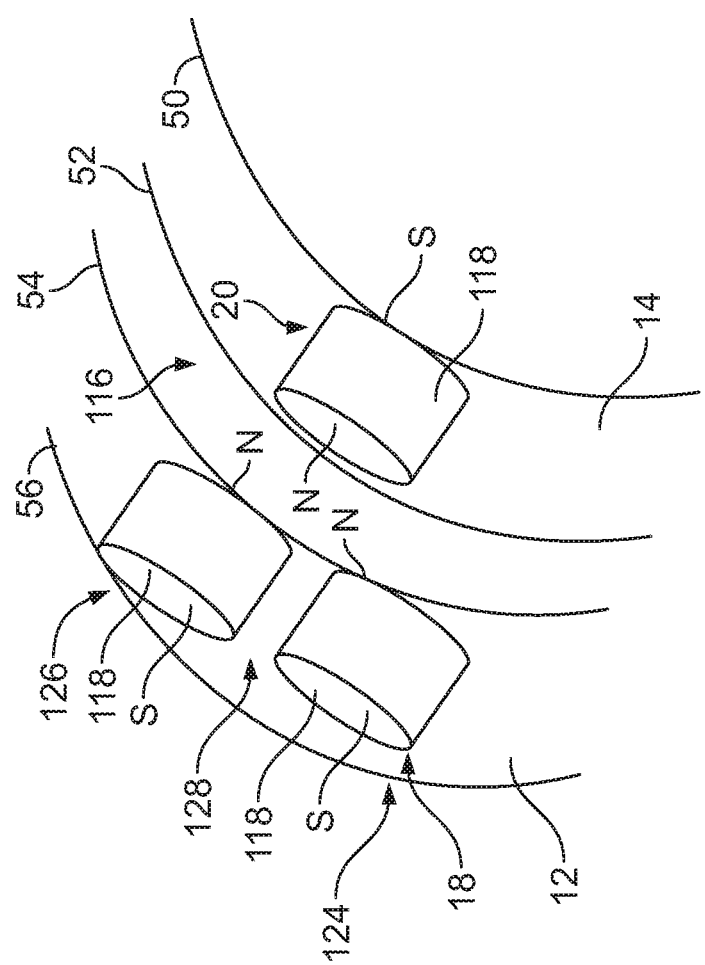
FIG. 9 schematically depicts a top view of a magnetic anti-rotation mechanism according to one or more embodiments shown and described herein.

Referring now to FIG. 9, embodiments of the magnetic anti-rotation mechanism 116 can be configured to align the cylinder 12 and the piston 14 utilizing repulsive force. Specifically, the first magnetic member 18 and the second magnetic member 20 can cooperate to generate a repulsive force that is configured to align the cylinder 12 and the piston 14. Accordingly, the polarity of the first magnetic member 18 can be arranged to face the same pole of the second magnetic member 20 to generate the repulsive force. For example, the north pole N of the first magnetic member 18 can be arranged to face the north pole N of the second magnetic member 20. It is noted that, while the magnetic anti-rotation mechanism 116 is depicted in FIG. 9 as utilizing the north pole N to generate the repulsive force, in some embodiments the south pole S of the first magnetic member 18 can be arranged to face the south pole S of the second magnetic member 20 to generate the repulsive force.

In some embodiments, the first magnetic member 18 can comprise a first magnetic guide 124 that is offset from a second magnetic guide 126. In one embodiment, each of the first magnetic guide 124 and the second magnetic guide 126 can comprise a stacked configuration of cylindrical-shaped magnets 118 provided in the horizontal orientation. The first magnetic guide 124 can be disposed within the cylinder 14 between the cylinder inner wall 54 and the cylinder outer wall 56. Additionally, the second magnetic guide 126 can be disposed within the cylinder 14 between the cylinder inner wall 54 and the cylinder outer wall 56. The first magnetic guide 124 can be separated from the second magnetic guide 126 to define an open region 128, i.e., a region without magnets, there between. The second magnetic member 20 can comprise stack of cylindrical-shaped magnets 118 provided in the horizontal orientation. The second magnetic member 20 can be disposed between the piston inner wall 50 and piston outer wall 52. The piston 14 can be aligned with the cylinder 12 such that the second magnetic member 20 is aligned with the open region 128, i.e., between the first magnetic guide 124 and the second magnetic guide 126. Thus, the piston 14 can be aligned with the cylinder 12 such that the repulsive force generated by the first magnetic member 18 and the second magnetic member 20 is relatively low. Rotation of the piston 14 with respect to the cylinder 12 can increase the magnitude of the repulsive force as the second magnetic member 20 is increasingly aligned with the first magnetic guide 124 or the second magnetic guide 126 of the first magnetic member 18. Accordingly, the first magnetic guide 124 and the second magnetic guide 126 can operate to constrain rotation of the piston 14 and maintain alignment with the open region 128. In further embodiments, the open region 128 can be set to permit a desired amount of rotation between the first magnetic guide 124 and the second magnetic guide 126 of the first magnetic member 18. In some embodiments, the rotation of the piston 14 with respect to the cylinder 12 can be set to a range of rotation less than or equal to about 40° such as, for example, a range of rotation less than or equal to about 30° in one embodiment.

It is noted that, while the first magnetic member 18 is depicted in FIG. 9 as comprising the first magnetic guide 124 and the second magnetic guide 126, in some embodiments the second magnetic member 20 can comprise one or more magnetic guides. Accordingly, the first magnetic member 18 can be provided as a single stack of magnets, and the second magnetic member 20 can comprise multiple stacks of magnets. It is furthermore noted that, while the first magnetic member 18 and the second magnetic member 20 are depicted in FIG. 9 as being formed from cylindrical-shaped magnets 118 provided in the horizontal orientation, the first magnetic member 18 and the second magnetic member 20 can be provided in any configuration suitable to provide repulsive force.

Referring collectively to FIGS. 2, 4a and 10, the device 10 can comprise an encoder 60 for sensing motion of the motor 36. In some embodiments, the encoder 60 can be connected to the top of the motor 36. Specifically, the encoder 60 can comprise a sensor 62 such as, for example, an optical reflective sensor or the like. It is noted that the term "sensor," as used herein, can mean a device that measures a physical quantity and converts it into a signal, which is correlated to the measured value of the physical quantity. Furthermore, the term "signal" can mean a waveform (e.g., electrical, optical, magnetic, or electromagnetic), such as DC, AC, sinusoidal-wave, triangular-wave, square-wave, and the like, capable of traveling through a medium.

The sensor 62 can be mounted to the top of the motor 36 and can face upward along the drive shaft 38. The encoder 60 can comprise a circular disk 64 having through holes 68 indexed to indicate motion of the motor 36. For example, the circular disk 64 can be attached to the drive shaft 38 and positioned approximately one millimeter above the sensor 62. The disk 64 can rotate with the motor 36, which can cause the through holes 68 to rotate with respect to the sensor 62. The sensor 62 can be operable to detect the through holes 68 and generate signals indicative of the rotational speed of the drive shaft 38. The signals can be utilized to determine the position of the piston 14 along the actuation axis 100. The sensor 62 can accommodate a large range of rotation speeds, which can be utilized to control the motor 36 to achieve various opening times.

Alternatively or additionally, the position of the piston 14 can be detected directly. In some embodiments, the device 10 can comprise a magnetic sensor 130 configured to detect the magnetic field of the magnetic anti-rotation mechanism 116. The magnetic sensor 130 can be any device configured to generate a signal that is indicative of a magnetic field such as, for example, a hall effect sensor. Accordingly, the magnetic field of the magnetic anti-rotation mechanism 116 can be correlated with the position of the piston 14 with respect to the cylinder 12. Specifically, the magnetic field of the magnetic anti-rotation mechanism 116 can be dependent upon the amount of overlap 132 of the first magnetic member 18 and the second magnetic member 20. Thus, as the overlap 132 changes due to motion of the piston 14, the magnetic sensor 130 can detect a corresponding change in the magnetic field of the magnetic anti-rotation mechanism 116. In some embodiments, the magnetic sensor 130 can be mounted to or within the cylinder 12. For example, the magnetic sensor 130 can be mounted within a support pillar 78 of the piston 12. Alternatively or additionally, the magnetic sensor 130 can be mounted in any position suitable to detect the magnetic field of the magnetic anti-rotation mechanism 116 such as, but not limited to, substantially perpendicular to the field lines of the magnetic field.

Figure 11B:
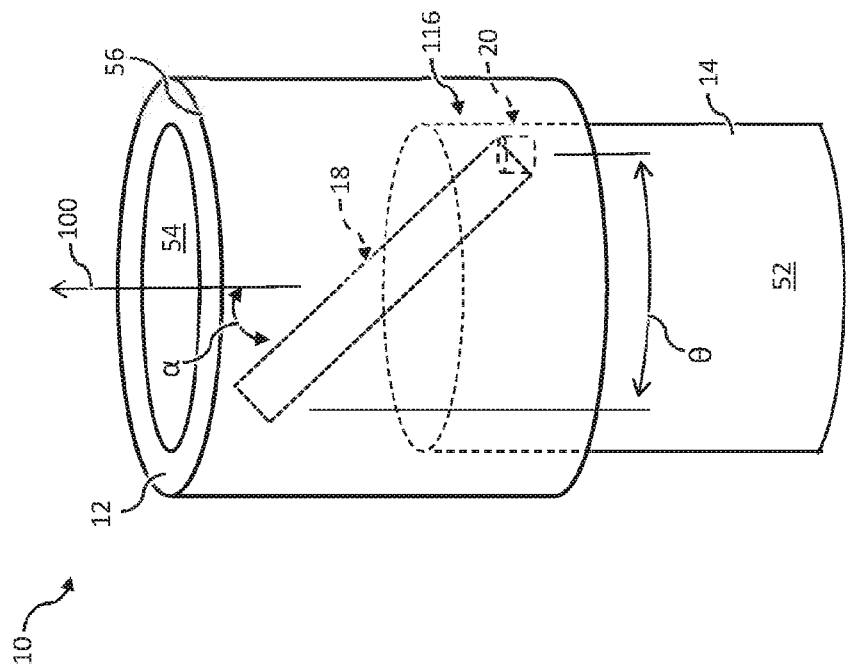
FIGS. 11A and 11B schematically depicts a device having magnetic anti-rotation mechanism for rotational control according to one or more embodiments shown and described herein.
Figure 11A:
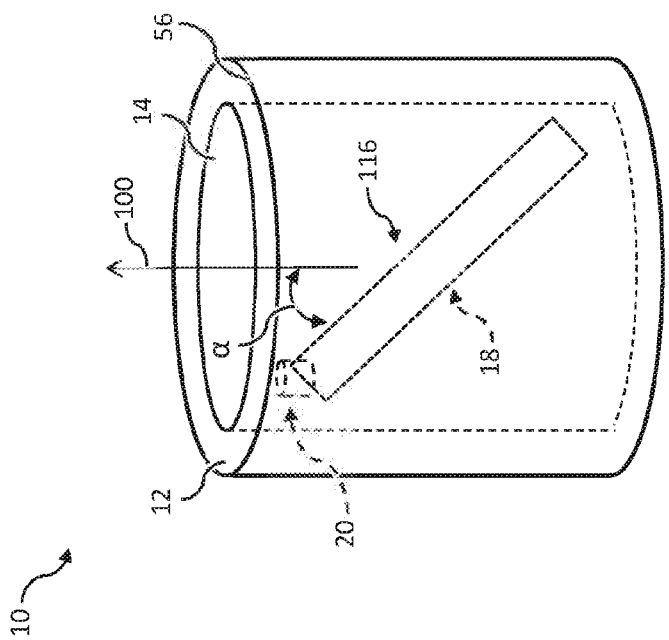

Referring collectively to FIGS. 11A and 11B, embodiments of the magnetic anti-rotation mechanism 116 can be configured for rotational control of the piston 14 as the piston 14 moves along the actuation axis 100. Specifically, the first magnetic member 18 and the second magnetic member 20 can be aligned with one another along a magnetic alignment angle α. In some embodiments, the first magnetic member 18 can be relatively large compared to the second magnetic member 20. For example, the first magnetic member 18 can be formed from a relatively large magnet or a stacked configuration of magnets. Alternatively or additionally, the second magnetic member 20 can be relatively large compared to the first magnetic member 18. The magnetic force of the magnetic anti-rotation mechanism 116 can be attractive such that the magnetic force urges the piston 14 into rotational motion with respect the to the cylinder 12 as the piston moves along the actuation axis 100. The rotation of the piston 14 can therefore be tuned to a desired amount of rotation θ. Accordingly, the piston 14 can be rotated to various settings, which can be utilized in valves having ports positioned at different angular locations along the cylinder 12. The rotation of the piston 14 with respect to the cylinder 12 can be set to any desired amount of rotation θ by adjusting to the magnetic alignment angle α. In some embodiments, the magnetic alignment angle α is substantially acute such as, for example, between about 10° and about 80° in one embodiment, or between about 20° and 60° in another embodiment.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Additionally, to the extent that the terms "on" or "onto" are used in the specification or the claims, it is intended to additionally mean "in," "into," or "near." Furthermore, to the extent the term "connect" is used in the specification or claims, it is intended to mean not only "directly connected to," but also "indirectly connected to" such as connected through another component or components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A device comprising:
    a cylinder forming a cylinder inner wall that extends along an actuation axis;
    a first magnetic member fixed to the cylinder;
    a piston disposed within the cylinder such that the piston is bounded by the cylinder inner wall and slides along the actuation axis and the cylinder inner wall; and
    a second magnetic member fixed to the piston to move with the piston axially relative to the cylinder and the first magnetic member;
    wherein the first magnetic member and the second magnetic member are aligned and interact to generate a magnetic force that mitigates rotation of the piston around the actuation axis.

2. The device of claim 1, further comprising a magnetic sensor that detects a magnetic field of the first magnetic member and the second magnetic member.

3. The device of claim 1, wherein the magnetic force is attractive.

4. The device of claim 1, wherein the magnetic force is repulsive.

5. The device of claim 1, wherein the cylinder and the piston are formed from a non-ferrous material.

6. The device of claim 1, wherein the first magnetic member is oriented parallel to the actuation axis and the second magnetic member is oriented at an acute angle to the actuation axis.

7. The device of claim 1, wherein the first magnetic member, the second magnetic member, or both comprise magnets that are in a stacked configuration.

8. The device of claim 7, wherein each of the magnets is separated by a spacer.

9. The device of claim 8, wherein the spacer comprises an electrical insulator, a dielectric material, or a combination thereof.

10. The device of claim 1, wherein the cylinder has orifices, and the piston is movable past the orifices to regulate fluid flow paths through the orifices.

11. The device of claim 10, further comprising a spring biasing the piston toward a closed position in which the piston closes the fluid flow paths through the orifices.

12. A device comprising:
a cylinder forming a cylinder inner wall that extends along an actuation axis;
a first magnetic member fixed to the cylinder;
a piston disposed within the cylinder such that the piston is bounded by the cylinder inner wall and slides along the actuation axis and the cylindrical inner wall;
a second magnetic member fixed to the piston to move with the piston axially relative to the cylinder and the first magnetic member; and
a lead screw drive operably connected to the piston, wherein rotation of the lead screw drive generates a translation of the piston along the actuation axis and the cylinder inner wall and a rotational force that urges the piston to rotate around the actuation axis;
wherein the first magnetic member of the cylinder and the second magnetic member are aligned and interact to generate a magnetic force, and wherein the magnetic force is greater than the rotational force.

13. The device of claim 12, wherein the first magnetic member of the cylinder is positioned within the cylinder between the cylinder inner wall and a cylinder outer wall.

14. The device of claim 12, wherein the second magnetic member is positioned within the piston between a piston inner wall and a piston outer wall.

15. The device of claim 12, wherein the cylinder has orifices, and the piston is movable past the orifices to regulate fluid flow paths through the orifices.

16. The device of claim 15, further comprising a spring biasing the piston toward a closed position in which the piston closes the fluid flow paths through the orifices.

17. A device comprising:
a cylinder forming a cylinder inner wall that extends along an actuation axis;
a piston disposed within the cylinder such that the piston is bounded by the cylinder inner wall, wherein the piston slides along the actuation axis and the cylinder inner wall; and
a plurality of magnetic anti-rotation mechanisms that are coupled to the cylinder and the piston;
wherein each of the magnetic anti-rotation mechanisms comprises a first magnetic member and a second magnetic member that are spaced apart and not in physical contact;
wherein the magnetic anti-rotation mechanisms coupled to the cylinder are fixed to the cylinder, and the anti-rotation mechanisms coupled to the piston are fixed to the piston for movement with the piston axially relative to the cylinder and the first magnetic anti-rotation mechanisms; and
wherein the first magnetic anti-rotation mechanism and the second magnetic anti-rotation mechanism interact to generate a magnetic force such that the magnetic anti-rotation mechanisms mitigate rotation of the piston around the actuation axis.

18. The device of claim 17, wherein the magnetic anti-rotation mechanisms are distributed evenly around the cylinder and the piston.

19. The device of claim 17, wherein the cylinder has orifices, and the piston is movable past the orifices to regulate fluid flow paths through the orifices.

20. The device of claim 19, further comprising a spring biasing the piston toward a closed position in which the piston closes the fluid flow paths through the orifices.

* * * * *